J. SMITH.
FRUIT PRESS.
APPLICATION FILED APR. 24, 1920.

1,366,291. Patented Jan. 18, 1921.
3 SHEETS—SHEET 1.

Inventor
J. Smith
By [signature] Atty

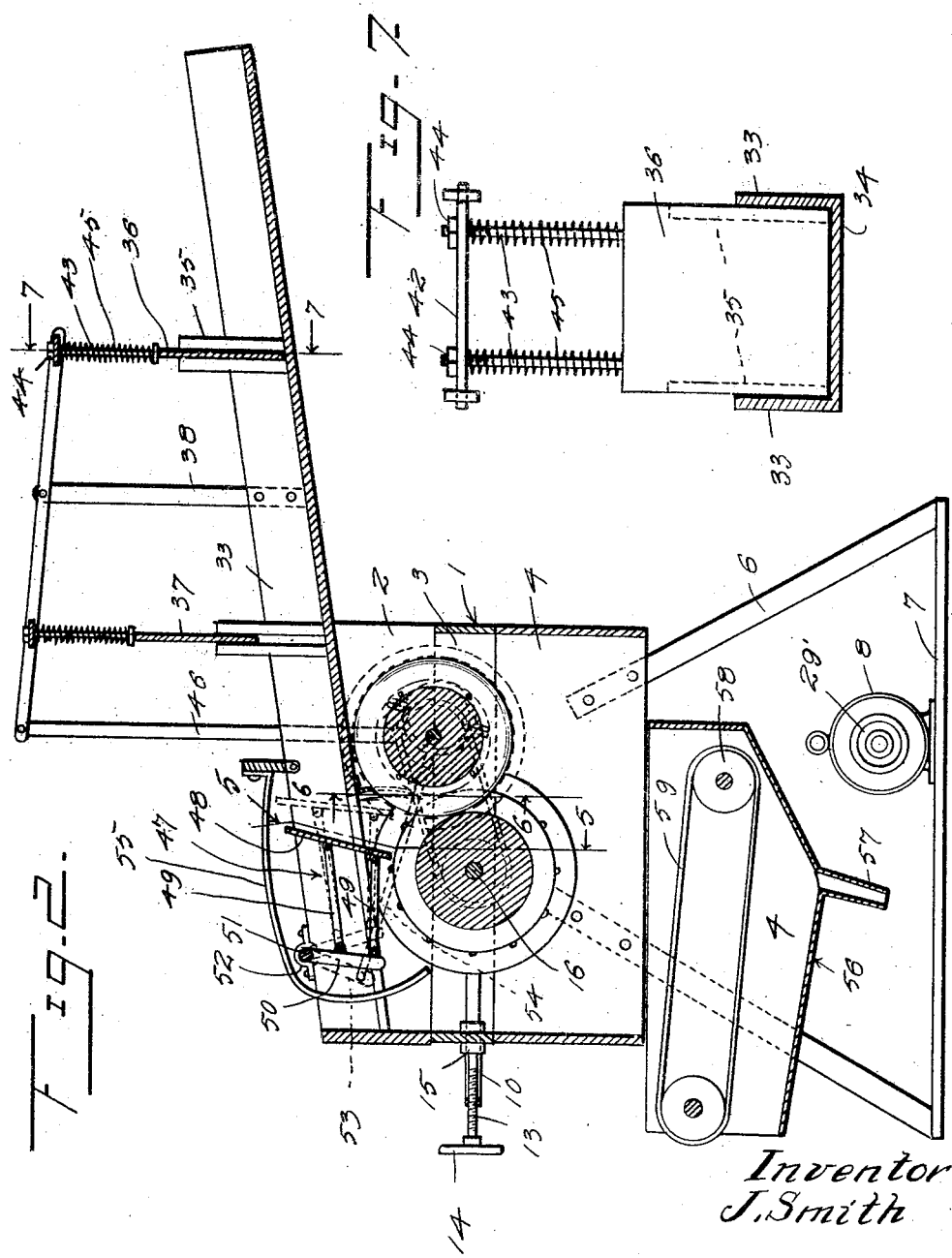

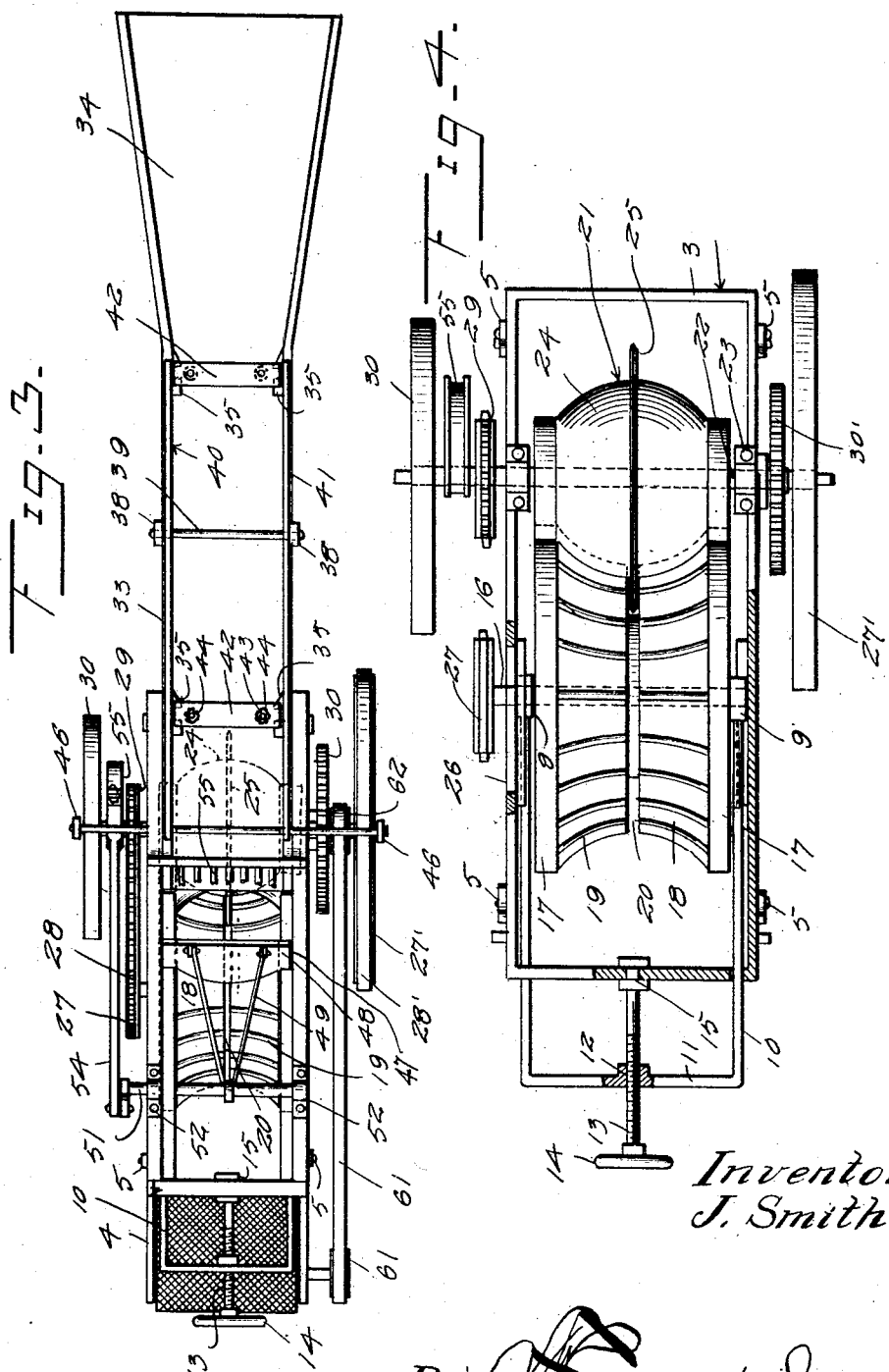

UNITED STATES PATENT OFFICE.

JAMES SMITH, OF PITTSBURG, CALIFORNIA.

FRUIT-PRESS.

1,366,291.  Specification of Letters Patent.  Patented Jan. 18, 1921.

Application filed April 24, 1920. Serial No. 376,304.

*To all whom it may concern:*

Be it known that I, JAMES SMITH, a citizen of the United States, residing at Pittsburg, in the county of Contra Costa and State of California, have invented certain new and useful Improvements in Fruit-Presses; and I do hereby declare the following to be a full, clear, and exact description of the invention, such as will enable others skilled in the art to which it appertains to make and use the same.

This invention relates to new and useful improvements in fruit presses and has for its primary object the provision of means whereby the fruit may be severed prior to being crushed or squeezed thereby rendering it comparatively easy to remove and obtain the full amount of juice from the fruit.

Another object of this invention is the provision of means for automatically feeding the fruit into the device one at a time so that each fruit will be first severed and then crushed to remove the juice therefrom.

A further object of this invention is the provision of a strainer which will separate the juice from the pulp and rind and convey said pulp and rind outwardly of the device.

A still further object of this invention is the provision of a fruit press of the above stated character, which shall be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1:
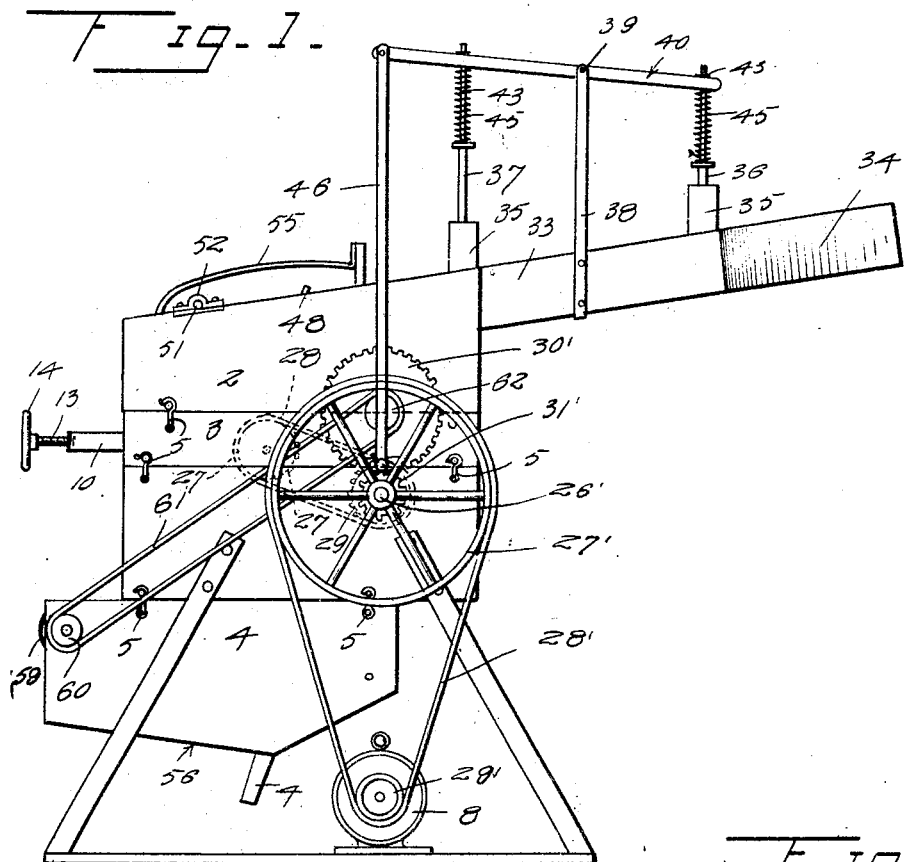
Figures 5, 6:
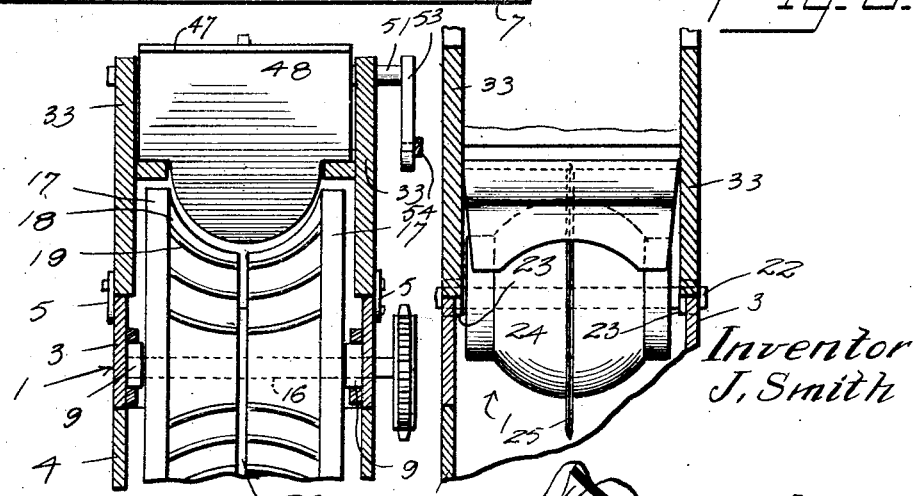

Figure 1 is a side elevation illustrating a fruit press constructed in accordance with my invention, Fig. 2 is a vertical sectional view illustrating the same, Fig. 3 is a top plan view, illustrating the device, Fig. 4 is a fragmentary longitudinal sectional view illustrating the adjustable crushing roller and further showing it associated with the knife, Fig. 5 is a sectional view taken on the line 5—5 of Fig. 2 looking in the direction indicated by the arrows, Fig. 6 is a similar view taken on the line 6—6 of Fig. 2 looking in the direction indicated by the arrows, Fig. 7 is a detail sectional view taken on the line 7—7, of Fig. 2, illustrating one of the control gates.

Referring in detail to the drawings, the numeral 1 indicates a casing or housing including upper intermediate and lower sections 2, 3, and 4 respectively, which sections are detachably connected by fastening elements 5, providing a construction wherein the housing or casing can be readily disassembled and stored away in a comparatively small space. The lower section 4 is provided with diverging legs 6 connected by a platform or base 7 on which is located a power source 8.

Bearings 9 are slidably mounted in guideways formed on the inner face of the intermediate section 3 and have connected thereto the ends of a substantially U-shaped adjusting frame 10, the bight portion 11 of which is disposed outwardly of the casing or housing and is provided with a screw threaded opening 12.

A screw threaded adjusting rod 13 having a handle 14 is threaded into the opening 12 and has its ends swivelly connected to the front wall of the section 3 of the casing or housing as illustrated at 15, thereby providing a construction wherein the location of the bearings 9 can be varied. The bearings 9 rotatably support a shaft 16 to which is secured a crushing roller 17. The crushing roller 17 has a concaved face 18 provided with transversely extending ribs 19. An annular groove 20 is formed in the concaved face of the crushing roller 17 and is adapted to receive a knife 25. The knife 25 is mounted on a shaft 22, journaled in bearings 23 carried by the section 3 of the casing or housing and is held between convex portions 24 adapted to be received by the concaved face of the crushing roller 17. One end of the shaft 16 extends through a slot 26 formed in the section 3 of the casing or housing and has secured thereto a sprocket wheel 27 over which is trained a sprocket chain 28. The sprocket chain 28 is in turn trained over a sprocket wheel 29 secured to a stub shaft 26' journaled to the wall of the lower section 4 of the housing or casing. A fly wheel 27' is secured to the stub shaft 26' and has trained thereover a belt 28' which is in turn trained over a pulley 29' secured to the shaft of the power source 8 whereby said crushing roller is driven by the power source. A gear 30' is secured to the end of the shaft 22 and meshes with a smaller gear 31' secured to the stub shaft, whereby upon rotation of the flywheel or stub shaft 26' by the power source 8, the knife 25 will be rotated. The other end of the shaft 22 is provided with a fly wheel 30.

A trough 33 is carried by the upper section 2 of the casing or housing and has the inner end of its bottom wall terminating at a point directly over the knife and crushing roller, while the other end of the trough is flared to form a hopper 34, in which the fruit is adapted to be poured. Spaced slide elements 35 are secured to the sides of the trough 33 and slidably receive gates 36 and 37 respectively. Supporting members 38 are secured to the trough 33 between the gates and have their upper ends connected by a rod 39 on which is pivoted a walking beam 41, that includes a pair of members 41 connected by plates 42. The plates 42 are provided with apertures to receive rods 43 that are formed on the upper ends of the gates 36 and 37. Nuts 44 are turned on the uper ends of the rods for preventing said rods from drawing through the openings of the plates. Springs 45 are mounted on the rods 43 and interposed between the plates 42 and upper ends of the gates 36 and 37, providing a construction that will permit the gates to remain elevated on the downward movement of the walking beam in case fruit is caught under the gates thus obviating the danger of crushing or injuring the fruit prior to entering the device. Rods 46 are pivotally connected to one of the ends of the members 41 of the walking beam 40 and are in turn eccentrically connected to the flywheel 27' and 30 respectively, thus it will be seen that the walking beam 40 is given an oscillatory movement and owing to this movement, the gates 36 and 37 are operated in opposite directions, that is, when the gate 36 is in its uppermost position, to permit fruit to enter the trough 33 in the hopper, the gate 37 is in its lowermost or closed position preventing said fruit from entering the machine. The gate 37 then rises and the gate 36 closes cutting off the supply of fruit from the hopper to the trough and the fruit already in the trough then passes into engagement with crushing roller 17 and knife 25.

A feeder 47 is located in the upper section 2 and at a point at the lower end of the trough 33 and includes a plate 48 which has its lower end shaped to conform to the contour of the crushing roller 17 and is received by the same. Links 49 are pivoted to the plate 48 and to a crank arm 50 formed on one end of a shaft 51 which is journaled in bearings 52 carried by the upper section 2 of the housing or casing. A crank arm 53 is formed on the other end of the shaft 51 and has connected thereto a rod 54 which is in turn connected to a cam 55 mounted on the shaft 22 so that on rotation of said shaft or knife, the feeder 47 will be reciprocated. The feeder is so turned that when fruit is deposited into the device from the trough 33, the plate 48 is at a point farther from the knife and then the plate 48 moves in the direction of the knife forcing the fruit against the same and severing said fruit so that the parts thereof fall onto the crushing roller and are squeezed by said crushing roller and convex face 24 of the knife removing the juices from the pulp.

An auxiliary housing 56 is detachably secured to the lower end of the lower section 4 of the casing or housing and has its bottom wall inclined in the direction of a discharge nozzle 57, thus providing a construction which will catch and convey the juices to a suitable receptacle (not shown) positioned under the discharge nozzle 57. Rollers 58 are journaled in the ends of the auxiliary housing 56 and one roller is disposed in a plane above the other and said rollers have trained thereover a belt or conveyer 59 constructed of foraminous material and which is adapted to act as a strainer. The juices and pulp fall upon the conveyer 59 and owing to its perforation, the juices pass through the same and discharge through the nozzle 57. The shaft of one of the rollers 58 has secured thereto a pulley 60 on which is trained a belt 61 and which is in turn trained over a pulley 62 secured to the shaft 22, thus it will be seen that the belt 59 is rotated or caused to travel in the direction of the opening end of the auxiliary housing 56 carrying off the pulp and rind.

While I have shown and described the preferred embodiment of my invention, it will be understood that minor changes in construction, combination and arrangement of parts may be made without departing from the spirit and scope of the invention as claimed.

Having thus described my invention, what I claims is:—

1. A fruit press comprising a casing, a crushing roller in said casing, a combined knife and roller associated with the crushing roller, means supplying fruit to the combined roller and knife and crushing roller, and means pressing the fruit against the knife prior to passing between the combined roller and knife and crushing roller.

2. A fruit press comprising a casing, a hopper for said casing, means controlling the fruit from the hopper into the casing, crushing means in said casing, a knife associated with the crushing means, and means adapted to press the fruit against the knife prior to being crushed.

3. A fruit press comprising a casing, a hopper for said casing, means controlling the fruit from the hopper to the casing, crushing rollers journaled in said casing, a knife carried by one of said rollers, and a feeder adapted to press the fruit against the knife prior to being crushed.

4. A fruit press comprising a casing, a hopper associated with the casing, means controlling fruit from the hopper to the casing, concave and convex crushing rollers journaled in said casing, a knife carried by the convex crushing rollers, and means pressing fruit against the knife to sever said fruit prior to passing between the crushing rollers.

5. A fruit press comprising a casing, a hopper associated with the casing, means controlling the fruit to the casing from the hopper, a concave crushing roller journaled in said casing and having an annular groove, a convex crushing roller journaled in said casing and received by the concavity of the concaved crushing roller, a knife carried by the convex crushing roller and received by the groove, and means pressing the fruit against the knife prior to passing between the crushing rollers.

6. A fruit press comprising a casing, means supplying fruit to said casing, a convexed crushing roller journaled in said casing and having an annular groove, a convex crushing roller journaled in said casing and located in a plane above the first named crushing roller and having its convex portion received in the concavity of the first named crushing roller, an annular knife carried by the convex portion of the convex roller and received by the annular groove, and a feeder adapted to automatically press fruit against the knife to sever the same prior to passing between the crushing rollers.

7. A fruit press comprising a casing, means supplying fruit to said casing, a convexed crushing roller journaled in said casing, a concaved crushing roller journaled in said casing, means for adjusting the concaved crushing roller toward and from the convexed crushing roller, a knife carried by the convex crushing roller, and a feeder adapted to press the fruit against the knife prior to passing between the crushing rollers.

8. A fruit press comprising a casing, crushing rollers journaled in said casing, a knife carried by one of said crushing rollers, a trough carried by said casing, a hopper carried by said trough, means adapted to alternately control fruit from the hopper to the trough and from the trough to the crushing rollers, and a feeder adapted to press fruit against the knife for severing the same prior to passing between the crushing rollers.

9. A fruit press comprising a casing, crushing rollers in said casing, a knife carried by one of said crushing rollers, a trough carried by said casing, a hopper carried by said trough, gates carried by said trough, means alternatingly operating said gates to regulate the movement of the fruit from the hopper to the trough and from the trough to the crushing rollers, and means pressing the fruit against the knife prior to passing between the crushing rollers.

10. A fruit press comprising a casing, crushing rollers journaled in said casing, means supplying fruit to the crushing rollers, an oscillatory shaft carried by said casing, a plate pivotally connected to said shaft, a knife carried by one of the crushing rollers, said plate adapted to press the fruit against said knife and sever the same prior to passing between the crushing rollers.

11. A fruit press comprising a casing, crushing rollers carried by said casing, a knife carried by one of said crushing rollers, means supplying fruit to said crushing rollers, means pressing the fruit against the knife prior to passing between the crushing rollers, an auxiliary housing carried by said casing, a combined strainer and conveyer in said housing for separating the juices from the pulp and rind and for conveying the latter to a foreign point, and a discharge nozzle for said auxiliary housing.

In testimony whereof I affix my signature in presence of two witnesses.

JAMES SMITH.

Witnesses:
 JOHN ROYCE,
 S. CARUSA.